United States Patent [19]

Reed et al.

[11] 4,352,906

[45] Oct. 5, 1982

[54] BLISTER RESISTANT CALCIUM CARBONATE FILLED POLYISOCYANURATE RESIN MOLDING COMPOSITIONS

[75] Inventors: Weldon N. Reed, Avondale, Pa.; Thomas J. Galvin, Wilmington, Del.

[73] Assignee: ICI Americas Inc., Wilmington, Del.

[21] Appl. No.: 290,524

[22] Filed: Aug. 6, 1981

[51] Int. Cl.$^3$ .................... C08G 18/04; C08L 75/04; C08K 3/26

[52] U.S. Cl. .................... 524/426; 524/507; 524/590; 524/425; 525/126; 525/130; 525/131

[58] Field of Search ............ 260/37 N, 37 AL, 42.53, 260/42.37; 525/126, 131, 130; 524/426, 507, 590

[56] References Cited

U.S. PATENT DOCUMENTS

| | | | |
|---|---|---|---|
| 3,426,099 | 2/1969 | Freifeld et al. | 525/130 |
| 3,907,751 | 9/1975 | Knight et al. | 525/130 |
| 3,979,547 | 9/1976 | Roberts et al. | 525/130 |
| 4,128,537 | 12/1978 | Markiewitz | 528/75 |
| 4,195,146 | 3/1980 | Markiewitz et al. | 528/75 |
| 4,207,222 | 6/1980 | Von Bonin | 260/42.53 |
| 4,222,929 | 9/1980 | Shanoski et al. | 525/131 |
| 4,232,133 | 11/1980 | Ferranini et al. | 525/452 |
| 4,289,682 | 9/1981 | Peters | 260/37 N |
| 4,296,020 | 10/1981 | Magrans | 260/37 N |

FOREIGN PATENT DOCUMENTS 608494  6/1980  U.S.S.R. .............................. 524/426

*Primary Examiner*—John C. Bleutge
*Assistant Examiner*—Herbert J. Lilling

[57] ABSTRACT

Fully cured calcium carbonate filled polyisocyanurate/polyurethane sheet molding compositions are improved in blister resistance at temperatures of 175°–205° C. by the incorporation therewith of from 0.05–2% based upon the weight of the carbonate of a polybutadiene telomers maleic anhydride addition products. Such compositions are most blister resistant when the polybutadiene telomer/maleic anhydride addition product is mixed with the resin ingredients prior to the addition of carbonate filler.

10 Claims, No Drawings

BLISTER RESISTANT CALCIUM CARBONATE FILLED POLYISOCYANURATE RESIN MOLDING COMPOSITIONS

This invention is directed to sheet molding compositions comprising ethylenically unsaturated polyisocyanurate resins, ethylenically unsaturated monomers, a polyurethane resin thickening agent, a calcium carbonate filler and a maleinised polybutadiene telomer anti-blistering agent. Of particular interest are polyvinylisocyanurate resins containing polyurethane, calcium carbonate filler and from 0.05-2.0 percent based on the weight of the carbonate of a maleic anhydride modified butadiene telomer having a molecular weight ranging from 500-4000 having copolymerized therewith from 10-50 parts per 100 parts telomer of maleic anhydride. It is also directed to a process for forming gelled solutions wherein aromatic polyisocyanate is added to a monomer solution of polyisocyanurate resin containing certain primary and secondary polyol reactants, calcium carbonate filler and maleinised polybutadiene. Furthermore, it is directed to thickened ethylenically unsaturated copolymer resin solutions which can be molded and cured at moderate temperatures and pressures to form completely cured polyvinyl isocyanurate resins of low profile containing up to 80 percent by weight particulate calcium carbonate filler and additional fiberglass reinforcing filler which can be subjected to temperatures as high as 175°-205° C. (350°-400° F.) for substantial time periods without the formation of blisters or pinholes.

In recent years the automobile industry has been striving to reduce weight of newly manufactured vehicles as a means for increasing gas mileage. A most attractive way to reduce weight is to switch from metal to lightweight plastic components. However, plastics are inherently weak and must be highly reinforced with fiberglass to meet tensile strength requirements and are further filled with calcium carbonate for economic reasons. When such compositions are employed in the fabrication of exterior body components such as tops, hoods, fenders, door panels, etc. in combination with metallic parts they are spray painted, passed through paint drying ovens and subjected to temperatures of 200° C. for periods as long as thirty minutes. Many resin formulas cannot undergo this high temperature treatment without sagging. However, recently discovered fully cured polyvinylisocyanurate/polyurethane resin blends have proven satisfactory at such high temperatures. However, even though physical properties are retained at these temperatures the compositions blister and form pinholes due to the expansion of gases contained in the fully cured resin. Surprisingly, this blistering problem is eliminated when maleinised polybutadiene is incorporated along with the calcium carbonate filler.

It is an object of the invention to provide for improved blends which are useful in preparing molding compositions by the reaction therewith of polyisocyanates comprising: polyethylenically unsaturated polyisocyanurate resin, ethylenically unsaturated monomer, organic polyols free of ethylenic unsaturation, calcium carbonate and from 0.5-2.0 percent by weight based upon the weight of the calcium carbonate of a polybutadiene telomer having a molecular weight of 500-4000/maleic anhydride addition product copolymer having 10-30 parts of succinic anhydride (reacted maleic anhydride) per 100 parts telomer.

It is a further object of the invention to provide for a tack-free molding composition by the addition to the polyol/vinylisocyanurate/monomer/calcium carbonate/maleinised polybutadiene blend of a polyisocyanate such that the mol ratio of the hydroxyl groups in the blend to the isocyanate groups in the added polyisocyanate ranges from 0.66-1.2.

Succinylated polybutadiene compounds (maleic anhydride/polybutadiene addition compounds) containing from 10-50 percent by weight succinic anhydride pendant groups can be readily obtained by well known free radical addition polymerization techniques to form materials ranging from fluid oils to highly viscous oils. In the preparation of these materials it is preferred to employ polybutadiene telomers having a molecular weight in the range of 900-3500 with at least equal molar amounts of maleic anhydride based on the equivalents of vinyl unsaturation present in the polybutadiene resin. Such materials can be manufactured or obtained commercially from Lithium Corporation of America under the trademark Lithene resins. A particularly useful material can be purchased as Lithene-PM25MA which contains 25 parts combined (succinic anhydride) per 100 parts polybutadiene. A similar material can be made according to the following synthesis.

Preparation I 200 grams of polybutadiene having a molecular weight of 3100 and 20-25 percent vinyl is reacted with 50 grams of maleic anhydride, 0.2 grams peroxide catalyst dissolved in 10 millileters of styrene and stirred under a nitrogen blanket for 5 hours at 180°-190° C.

It has been recently discovered that ethylenically unsaturated polyisocyanurates such as poly(1,3,5-tri-R-s triazine-2,4,6-trione) may be thickened and copolymerized with unsaturated monomer when the R groups contain ethylenic unsaturation. R groups may also be linked with epoxy, polyurethane and polyester resin. Such compositions are described in U.S. Pat. No. 4,232,133 which is hereby incorporated by reference. Of particular interest are polyvinylisocyanurates described in U.S. Pat. Nos. 4,128,537 and 4,195,146. Such ethylenically unsaturated polyisocyanurate resins have a molecular weight in the range of 2000-200,000 and may be prepared by reacting an aromatic polyisocyanate with one or more of vinylidene hydroxy compounds to form an isocyanate containing urethane which is thereafter trimerized to form isocyanurate linkages in the presence of trimerization catalysts such as metallic salts of carboxylic acids tertiary means and the like. Of particular interest are products formed by reacting an aromatic polyisocyanate and a monohydric alcohol selected from the group consisting of hydroxypropylmethacrylate, hydroxypropylacrylate, hydroxyethylmethacrylate, hydroxyethylacrylate, pentaerythritol triacrylate, allyl alcohol, dibromoneopentylglycol monoacrylate and monoacrylate or monomethacrylate esters of bisphenol A . Polyisocyanates may be selected from the group consisting of 2,4-toluene diisocyanate, 2,6-toluene diisocyanate, m-phenylene diisocyanate, p-phenylene diisocyanate, 4,4'diphenylether diisocyanate, and polymethylene polyphenylene isocyanates having 2-6 isocyanate groups per molecule. A typical polyvinylisocyanurate resin can be prepared by the following technique:

Preparation II

Into a chemical reactor equipment with agitator, condenser, gas pipe connections, vents, and portholes which is first flushed with nitrogen and thereafter sparged with 2 cfm. air and 6 cfm. nitrogen is added 2,680 parts of hydroxypropylmethacrylate and agitated at 30 revolutions per minute. Thereafter, 2.5 parts copper acetate catalyst, 12 parts of a 20 percent solution of t-butylcatacol and 5,743 parts styrene is charged to the reactor. The contents of the reactor are adjusted to 42°±2° C. and thereafter sparged with 3-4 cfm. nitrogen. Under increased agitation, 50-60 revolutions per minute, 3,064 parts of toluene diisocyanate is added at a rate of 60-70 parts per minute in four 766 part portions. After the first 766 part portion is added, the temperature is permitted to rise to 65° C. After the second portion the temperature is permitted to rise to 78° C. After the third portion the temperature is permitted to rise to 90° C. and after the fourth portion the temperature is permitted to go no higher than 93° C. The reaction mix is permitted to stir for one additional hour at 90° C. at which time the unreacted isocyanate content should be less than 4.5 percent. The reaction mix is cooled to 55° C. and then mixed with 18 parts N-benzyl trimethyl ammonium hydroxide as a 40 percent methanol solution. The exothermic trimerization reaction takes place and with additional cooling the reaction mixture should not be permitted to go above 60° C. The reaction is permitted to continue until the unreacted isocyanate content range is between 0.05-0.15 percent and the viscosity range is between 425-475 cps. At this point, 6 parts of methane sulphonic acid is added to inhibit the activity of the trimerization catalyst. The styrene/polyisocyanurate resin solution is stored for later use under conditions which inhibit further polymerization.

This reaction product has a number average molecular weight of about 1160, a weight average molecular weight of about 2000, and a polydispersity of about 1.9. About 95 percent of the isocyanurate present have a molecular weight of below about 5200 and contain some isocyanurates having a molecular weight about 5200 and below about 26,000. This product corresponds to a resin where the number of isocyanurate rings in most of the isocyanurate molecules is less than 10. This product has a ball and ring melting point of about 95° C. and a viscosity in 50 percent styrene solution of about 400-600 cps at 25° C., and a reactive index of about 1.557 $ND^{20}$. The infrared spectrum of this product shows absorption being characteristic of isocyanurates and the essential absence of isocyanate functionality. The hydroxyl number of the product is essentially 0.

This material is further treated to prepare an allophanate-free resin by heating 100 parts in admixture with 0.4 parts of Triton B (40 percent solution of benzyl trimethyl ammonium hydroxide in methanol and 0.5 parts of a 10 percent solution of equal amounts of t-butylcatacol and monomethylether of hydroquinone for a period of 1½ hours at 95° C.

While the material of Preparation II is made as a 50 percent styrene solution additional ethylenically unsaturated monomers may be added thereto or in place of the styrene such as vinyltoluene, divinylbenzene, acrylate acid or methacrylate acid esters such as methylmethacrylate, ethylacrylate, n-butylacrylate, 2-ethylhexylacrylate, methylmethacrylate, pentaerythitol polyacrylate, ethylene glycol dimethacrylate, diallyl maliate, diallyl fumurate, triallyl isocyanurate, vinylacetate, vinylpropinate, vinyl ether, acrylonitrile and the like. In general, by ethylenically unsaturated monomers has a relatively low molecular weight compound having at least one ethylenically unsaturated group which will react with itself or with ethylenic unsaturation in the polyisocyanurate resin by free radical activation.

The polyvinylisocyanurate resin/ethylenically unsaturated monomer solution is thickened by the addition of polyurethane forming ingredients selected from certain polyols and polyisocyanates. In practise the invention is normally carried out by mixing polyol with polyisocyanurate resin/monomer solution, maleinised polybutadiene, coloring agents, reinforcing agents, release agents, catalysts, accelerators and stabilizers and thereafter stirring in up to 80 percent by weight of powdered calcium carbonate as filler. Resin blends useful in preparing sheet molding compositions by the addition of polyisocyanate thereto comprise 5-95% by weight polyethylenically unsaturated polyisocyanurate resin having a molecular weight in the range of 2,000-200,000, 5-95% ethylenically unsaturated monomer, 1.5-30% organic polyol, 30-80% calcium carbonate, and 0.05-2% based on the weight of calcium carbonate of a polybutadiene/maleic anhydride addition product. The blend is stirred or milled until uniformly dispersed prior to the addition of the polyisocyanate which reacts with the polyol to form polyurethane which thereby thickens the blend to a tack free gel.

The polyisocyanate reactant may be any isocyanate, however, aromatic isocyanates as described in the preparation of polyisocyanurate resins described above are preferred.

The polyols may be selected particularly from polyethers and polyesters having terminal hydroxyl groups and having molecular weights ranging from 300-2000. Of particular interest are polyols of polyethylene glycol, polyisopropylene glycol, polytetramethylene glycol and polyhexamethylene glycol having molecular weights in the range of 650-1000. Polyol ethers of bisphenol A which are condensation product of propylene oxide with bisphenol A having molecular weights in the range of 350-750 are most effective. Dihydroxy terminated polyesters derived from glycols and polyether glycols having molecular weights of up to 2000 are also useful in preparing polyurethane thickened polyisocyanurate resins. In addition to these higher molecular weight polyols can be employed chain extenders such as ethylene glycol, glycerin propylene glycol and pentaerythitol. Ethylenically unsaturated polyols may be used in place of or in addition to these polyols. A preferred type of unsaturated polyol is prepared by reaction of a diglycedyl ether with an unsaturated acid or hydroxy ester.

Conventional free radical generator type catalyst and optional accelerators may be employed which are effective at the temperatures of the final cure. A choice of initiators and free radical generators can be employed such that the addition reaction between the ethylenically unsaturated ingredients is carried out slightly before, during or after the urethane thickening reaction takes place between the polyol and the isocyanate urethane precursors. Selection of appropriate urethane promoter catalysts or urethane inhibitors can be made to insure the desired relative timing between the two rates of polymerization.

Preparation III 92 parts polyisocyanurate resin of Preparation II containing 50 percent styrene is blended with 3.8 parts polyoxypropylene (2) bisphenol A, 0.35 toluhydroquinone (10 percent solution in acetone) and stored for use in the following examples.

The incorporation of the maleinised polybutadiene into sheet molding compositions can be demonstrated but not limited to the following examples:

EXAMPLE 1

The following ingredients are mixed in a five gallon plastic bucket using a 6 inch bladed cowles dissolver. The ingredients are added in the order listed and are stirred for a few seconds after each addition to form a slurry.

| Ingredients | Parts (by weight) |
|---|---|
| Polyvinylisocyanurate Resin/Styrene/polyoxypropylene (2) bisphenol A of Preparation III | 65 |
| Maleinised Polybutadiene Lithene ® PM25MA (25 parts bound succinic anhydride per 100 parts polybutadiene having molecular weight 1300) | 0.75 |
| Dibutylindilaurate | 0.15 |
| Peroxide Catalysts (Noury Trigonox ® 29B75) | 1 |
| Plastic Color Black (2015) | 1 |
| LP90, (Union Carbide) polyvinylacetate | 30 |
| Zinc Stearate | 1 |
| Calcium Carbonate (Camel Wite) | 150 |
| Polymethylene Polyphenylene Polyisocyanate (Rubinate ® M) | 3.30 |

The formulated ingredients are compounded with 1 inch chopped fiberglass on a standard sheet compounding machine. To prepare a 14 ounce per square foot sheet, 120 grams of chopped glass per square foot is sandwiched between two layers of resin slurry which are dispensed from two doctor boxes onto moving sheets of polyethylene, nylon or polyester film. The doctor blades are set to disperse 140 grams of slurry per square foot of moving film. The sandwiched sheet then passes through a series of heated (100° F.) kneading rollers which are set to impart 80 psi of pressure. The compounded sheet is wound onto a spool where it is wrapped with several layers of film to prevent styrene evaporation. The sheet molding composition sheet weighing about 50 pounds for this formulation is then stored at room temperature to allow for thickening of the ingredients to a moldable consistency having a viscosity greater than 5 MM centipoises. After three days of maturation at room temperature the roll of sheet molding composition was opened and found to be tack-free and flexible.

One foot square panels were molded by placing five 7 inch squares of the sheet molding composition (34 percent mold coverage) in a 12 inch flat press heated to 280° F. under pressures of 1,000 psi for three minutes to form a plaque having a thickness ranging from 138–159 mils. This plaque along with another plaque having a thickness ranging from 122–145 mils made as recited above but having no maleinised polybutadiene additive were placed in a convection oven preheated to 400° F. for a period of thirty minutes. The plaque made as cited above with Lithene additive did not develop pinholes or blisters but the surface was somewhat crazed. The panel made without the maleinised polybutadiene additive developed many blisters some as much as 4 inches in diameter with ruptures occuring in the blister area.

EXAMPLE 2

It has been found that the addition of small amounts, 0.1–2%, by weight of unbound maleic anhydride to the formulation described in Example 1 inhibits the maturation process due to thickening caused by the reaction of polyol with polyisocyanate for about thirty minutes. This delayed reaction time permits improved wetting and intermixing of the resin ingredients with carbonate filler and glass-reinforcing fibers.

This delay in maturation can be demonstrated by the addition of 0.25 parts of maleic anhydride to the composition of Example 1. A comparison of the maturation rate of the material of Example 1 and that of Example 2 containing maleic anhydride is shown in the table below.

TABLE 1

| | Maturation Rate | |
|---|---|---|
| | Viscosity (centipoises/1000) | |
| Time | Example 1 | Example 2 |
| 0 | 23 | 28.8 |
| 15 min. | 23 | 28.8 |
| 30 min. | 96 | 28.8 |
| 45 min. | 224 | 51.2 |
| 60 min. | 480 | 76.8 |
| 1 day | 8,640 | 12,000 |
| 2 days | 12,000 | 18,000 |
| 4 days | 17,000 | 27,000 |
| 6 days | 22,000 | 34,000 |
| 12 days | 22,000 | 34,000 |

The ingredients are formulated in the order described in Example 1 and are monitored for viscosity in a one pint container employing a Brookfield HBT Viscometer over a period of twelve days.

The Example 2 formulation was processed into molding stock employing the standard sheet molding machine as described in Example 1. Five layers of this sheet measuring 7 inches square were placed in the press at 280° F. and held at 800 psi for 2.5 minutes. The 12 inch square by 150 mil thick panels made in this way were placed in a convection oven at 400° F. for thirty minutes. These panels showed no signs of blistering or pinhole formation. A plaque made from this same formulation but without the polybutadiene derivative developed blisters when exposed at the same temperatures.

EXAMPLE 3

Improvement is realized even when an accelerated maturation is caused by the incorporation of a urethane reaction promoter such as polyoxypropylene (3) oxyethylene monoethoxylated ethylenediamine. This cocatalyst enhances both initial and final maturation and produces a thickened molding composition having a viscosity in the range of about 130 MM cps. Even under these conditions where it would be expected to entrap excessive amounts of air during the formulation step the molded plaques made therefrom having a thickness in the range of 130 mils do not blister when subjected to temperatures at 400° F. for thirty minutes.

The formulation of Example 1 was accelerated in maturation by the addition of 0.10 part of polyoxypropylene (3) ethoxylated ethylenediamine. The initial viscosity was 56,000 cps which maturated within five days to 132 MM cps.

EXAMPLE 4

In this formulation the low profiling agent polyvinyl acetate (LP90, Union Carbide) used in Example 1, is replaced with 30 parts of a 40% solution in styrene of a styrenebutadiene copolymer sold by Amoco under the designation 1M9.

The formulation was processed into sheet molding compound as described in Example 1 and plaques measuring 15 inches by 30 inches by 128 mils in thickness were molded from five plies of the sheet molding composition cut into 6.5 inch by 20 inch rectangles. These plies were cured at 280° F. under 1000 psi of pressure for three minutes. The resulting plaque was heated at 355° F. in a convection oven for thirty minutes without blister formation.

EXAMPLE 5

Blister formation is particularly sensitive to the temperature at which the panel is exposed. To demonstrate blister formation as a function of temperature four 12 inch square plaques, two from the formulation of Example 1 with and without the additive and two from Example 4 with and without the maleic anhydride/polybutadiene additive each having a thickness of 125 mils were prepared by compressing four plies of 7 inch×7 inch sheet at 280° F. under 800 psi for 2.5 minutes. One plaque from each formulation was placed in a convection oven at 350° F. for thirty minutes. No plaque developed blistering or pitting at this temperature. Another set of identical plaques were exposed at 375° F. for thirty minutes. The plaques containing the maleic anhydride/polybutadiene additive developed only one small blister on one edge while all the others containing no additive were covered with twenty or more blisters some of which were as large as 2 inches in diameter.

What is claimed is:

1. A resin blend useful in preparing blister resistent fully cured articles when heated at temperatures of 175–205° C. which comprises a polyethylenically unsaturated polyisocyanurate polymer resin, an ethylenically unsaturated monomer, a polyurethane thickener, 30–80 percent by weight of a powdered calcium carbonate filler and from 0.05–2.0 percent based upon the weight of the calcium carbonate in the blend of a polybutadiene telomer/maleic anhydride addition product formed by copolymerizing said telomer having a molecular weight in the range of 500–4000 with 5–50 parts by weight of maleic anhydride per 100 parts telomer.

2. A composition of claim 1 which is formulated by mixing the polybutadiene/maleic anhydride adduct with the resin ingredients prior to incorporating calcium carbonate filler therewith.

3. A composition of claim 1 wherein said ethylenically unsaturated monomer is selected from the group consisting of styrene, vinyl toluene, divinylbenzene, the methyl, ethyl, n-butyl, 2-ethylhexyl or pentaerythitol esters of acrylic or methacrylic acid, triallyl isocyanurate, vinyl acetate, diallyl fumarate, vinyl ether and acrylonitrile.

4. A composition of claim 1 wherein said ethylenically unsaturated monomer is styrene.

5. A composition of claim 1 wherein said polyisocyanurate resin is a condensation product of hydroxypropylmethacrylate and toluene diisocyanate.

6. A composition of claim 1 where said polyethylenically unsaturated resin is a polyisocyanurate resin having a molecular weight in the range of 2,000–200,000.

7. A composition of claim 1 wherein said polyurethane is a reaction product of organic polyols having 2–6 hydroxyl groups and polyisocyanates having 2–5 isocyanate groups.

8. A composition of claim 7 wherein said polyols are reaction products of bisphenol A with alkylene oxides having 2–3 carbon atoms and said polyisocyanate is selected from polymethylene polyphenyl polyisocyanate, toluene diisocyanate and diphenylmethane diisocyanate.

9. A resin blend useful in preparing a composition of claim 1 by the addition thereto of polyisocyanate which comprises a polyethylenically unsaturated polyisocyanurate resin having a molecular weight in the range of 2,000–200,000, an ethylenically unsaturated monomer, an organic polyol free of ethylenic unsaturation, 30–80 percent by weight of powdered calcium carbonate filler and 0.05–2 percent by weight based upon the weight of said calcium carbonate of a polybutadiene telomer having a molecular weight of 500–4000/maleic anhydride addition product having 10–30 parts succinic anhydride per 100 parts telomer.

10. A composition of claim 9 further comprising 0.1–2% by weight unreacted maleic anhydride.

* * * * *